United States Patent
Bullock

(10) Patent No.: US 10,426,235 B2
(45) Date of Patent: Oct. 1, 2019

(54) PORTABLE SHADE PROVIDER

(71) Applicant: Richard Thomas Bullock, Crestview, FL (US)

(72) Inventor: Richard Thomas Bullock, Crestview, FL (US)

( * ) Notice: Subject to any disclaimer, the term of this patent is extended or adjusted under 35 U.S.C. 154(b) by 0 days.

(21) Appl. No.: 15/932,012

(22) Filed: Jan. 24, 2018

(65) Prior Publication Data

US 2018/0209166 A1     Jul. 26, 2018

Related U.S. Application Data

(60) Provisional application No. 62/499,451, filed on Jan. 25, 2017.

(51) Int. Cl.

| | |
|---|---|
| *A45B 23/00* | (2006.01) |
| *B62B 5/00* | (2006.01) |
| *A45B 11/00* | (2006.01) |
| *A45B 17/00* | (2006.01) |
| *A45C 13/38* | (2006.01) |
| *A45F 3/44* | (2006.01) |
| *B62B 1/12* | (2006.01) |

(52) U.S. Cl.
CPC .............. *A45B 23/00* (2013.01); *A45B 11/00* (2013.01); *A45B 17/00* (2013.01); *A45C 13/385* (2013.01); *A45F 3/44* (2013.01); *B62B 1/12* (2013.01); *B62B 5/0013* (2013.01); *A45B 2023/0012* (2013.01); *A45B 2200/1009* (2013.01)

(58) Field of Classification Search
CPC . A45B 17/00; A45B 19/04; A45B 2200/1063; A45B 23/00; E04H 12/22; B62B 1/262
See application file for complete search history.

(56) References Cited

U.S. PATENT DOCUMENTS

| | | | | | |
|---|---|---|---|---|---|
| 719,268 | A | * | 1/1903 | Slyder ................. | H01Q 1/1221 248/534 |
| 970,751 | A | * | 9/1910 | Franke .................. | A01K 97/10 135/16 |
| 2,559,421 | A | * | 7/1951 | Garrett .................. | A45B 11/00 108/50.12 |
| 2,806,711 | A | * | 9/1957 | Jacobs ................... | B62B 1/262 211/70 |
| 3,215,095 | A | * | 11/1965 | Keppeler ................ | A45B 3/00 108/50.12 |
| 3,866,934 | A | * | 2/1975 | Braun .................... | A63B 55/60 280/655 |
| 4,315,632 | A | * | 2/1982 | Taylor ..................... | B62B 1/12 280/40 |
| 4,913,428 | A | * | 4/1990 | Nauman .............. | A63B 71/023 135/118 |
| 5,310,155 | A | * | 5/1994 | Wu ....................... | F16M 13/022 224/274 |
| 5,636,852 | A | * | 6/1997 | Sistrunk ................. | B62B 1/12 248/156 |

(Continued)

*Primary Examiner* — Noah Chandler Hawk

(57) ABSTRACT

One embodiment of a portable shade maker includes a collapsible cart and a telescoping and tiltable umbrella for the protection and comfort of individuals conducting activities that is lightweight and easy to relocate according to the chosen activity. The load platform can have a flange base that can accept and secure an umbrella. In addition, it can be used to carry supplies, tools, and activity equipment on its load platform to the destination location.

9 Claims, 7 Drawing Sheets

(56) References Cited

U.S. PATENT DOCUMENTS

| | | | | |
|---|---|---|---|---|
| 5,711,331 A * | 1/1998 | Harris | A45B 9/00 | 135/16 |
| 5,803,471 A * | 9/1998 | DeMars | B62B 1/125 | 280/40 |
| 5,957,145 A * | 9/1999 | Plumer | E04H 12/2238 | 135/117 |
| 6,003,826 A * | 12/1999 | Galloway, III | F16M 13/02 | 248/519 |
| 6,113,129 A * | 9/2000 | Marques | B62B 1/12 | 248/129 |
| 6,401,736 B1 * | 6/2002 | Jerry | A45B 11/00 | 135/25.1 |
| 6,810,890 B2 * | 11/2004 | Lin | A45B 17/00 | 135/16 |
| 7,540,561 B2 * | 6/2009 | McWhorter | A45B 11/00 | 135/16 |
| 8,393,343 B2 * | 3/2013 | VanVonderen | E04F 11/181 | 135/16 |
| 8,573,609 B1 * | 11/2013 | Moser | B62B 1/14 | 135/118 |
| 2006/0107979 A1 * | 5/2006 | Kim | A45B 5/00 | 135/16 |
| 2016/0326765 A1 * | 11/2016 | Barbret | E04H 15/02 | |
| 2017/0202321 A1 * | 7/2017 | Maurello | A45B 23/00 | |

* cited by examiner

PORTABLE SHADE PROVIDER

CROSS-REFERENCE TO RELATED APPLICATIONS

This application claims the benefit of PPA Ser. No. 62/499,451, filed Jan. 25, 2017 by the present inventor, which is incorporated by reference.

BACKGROUND

Prior Art

The following is a tabulation of some prior art that presently appears relevant.

| Pat. No. | Kind Code | Publication Date | Patentee(s) |
|---|---|---|---|
| U.S. patents | | | |
| U.S. Pat. No. 9,440,668 | B | Sep. 13, 2016 | Zhaosheng Chen, Yishun Chen |
| U.S. Pat. No. 5,464,237 | A | Nov. 7, 1995 | Elena H. Saporiti |
| U.S. Pat. No. 5,575,301 | A | Nov. 19, 1996 | Mark A. Bolton |
| U.S. Pat. No. 5,876,047 | A | Mar. 2, 1999 | Macy S. Dennis |
| U.S. Pat. No. 5,857,684 | A | Jan. 12, 1999 | Gordon Liao, A |
| U.S. Pat. No. 6,726,227 | B2 | Apr. 27, 2004 | Robin Morgan |
| U.S. Pat. No. 5,857,695 | A | Apr. 17, 1997 | Stacey Lee Crowell |
| U.S. Pat. No. 7,703,469 | B2 | Apr. 27, 2010 | Warren L. Danziger |
| U.S. Pat. No. 659114 | A | Jul. 6, 1900 | Alexis Voorhies |
| Foreign patents | | | |
| GB 2137937 | A | Aug. 14, 1982 | Michael Noel Warnes, Malcolm H. King |

Existing solutions used to protect individuals from the sun and rain have been either fixed or mobile. The fixed solutions limits the shade benefit to a single location. Other limitations are included for the more relevant patents.

Prior art reveals mobile shelters on a limited scale. Solutions such as U.S. Pat. No. 9,440,668—Umbrella Table Folding Cart, utilizes a 4 wheeled wagon that receives an umbrella through a hole in the center of the table. The width of the table reduces the shaded space for an individual to perform various athletic or working activities underneath the protection of the umbrella. Additionally, a second disadvantage is the weight and size of the table which lessens its ease of portability.

Another prior art U.S. Pat. No. 5,464,237 Folding Cart describes a foldable cart for transporting camping, beach equipment to a location otherwise not easily accessible by vehicle. The stated intention here is for transporting equipment. It is not meant for conducting various activities such as swinging a golf club or shooting at an archery or gun range. Again the width of the table would lessen the ability to get protection from the umbrella.

The prior art U.S. Pat. No. 5,575,301 Mobile Shelter describes a movable canopy found mostly at Country Club and College Golf Team destinations. The disadvantages here are a much higher cost for such a device and the inability to easily transport such a device by an individual.

The prior art U.S. Pat. No. 5,876,047 A a utility cart that includes two or more tables that are hinged to the cart which can accommodate two umbrellas. The said utility cart does not collapse the wheels and the umbrellas are intended to provide shade for the cart and its components. Again, the device leaves little room for an individual conducting an activity.

Another prior art is a collapsible golf cart U.S. Pat. No. 5,857,684 A which is only used to protect the user while pulling the cart. The user must then step away from this protection in order to have sufficient room to swing.

Humans have been protecting themselves from both the heat and the harmful rays of the sun for a very long time. The parasol and umbrella have served the useful purpose of protecting the human by holding the umbrella while standing or walking. They can also be useful for people sitting underneath one on their deck or at a restaurant.

For people that indulge in activities that require the use of both hands such as golf, gardening, archery, photography, painting and other outdoor activities, there are not many choices.

SUMMARY

The purpose of the shade provider embodiment presented here is to make up for the shortcomings of current existing inventions that provide the protection of shade. In accordance with one embodiment, a portable shade provider includes a telescoping and tiltable umbrella attached to a push cart that has fold-in wheels and collapsible handle. The load platform utilizes either a weight on said platform and/or anchoring devices deployed around the flat bracing of the load platform to lessen effects created by the wind.

Advantages

Accordingly, there are several advantages to the portable shade provider presented with this patent application. This said portable shade provider is less expensive than the canopies used at some golf ranges. The said shade provider is easy to set up. It utilizes a larger beach size umbrella/parasol that is of sufficient size to protect most of one's exposed body. The umbrella can tilt to adjust for sun movement, and be adjusted higher to allow more room to conduct certain activities. It also can be collapsed easily to fit in one's vehicle trunk. Another advantage is that said umbrella will reduce exposure to UV rays that are known to cause cancers that both kill and cause the skin to age and wrinkle.

Finally, another important advantage of using this shade provider is the cooler environment that it provides. Many individuals will be more productive and less prone to error when their activity is conducted in a more comfortable environment. Owners of businesses such as a golf driving range will enhance their facilities by providing this benefit to those who practice their golf swings. There are many other activities that will be made more comfortable and safer with this provider of shade. To name a few; gardening, tennis between sets, outdoor photography, and painters. There are also many outdoor activities around the house that can be made more comfortable and safer. These and many other activities could benefit from less exposure to UV rays and made more comfortable by the 10-15 degree cooling effect of shade.

DRAWINGS

Figures

Drawings Reference Numerals

| | |
|---|---|
| 1. Umbrella | 2a. Umbrella telescoping pole |
| 2b. Auxiliary telescoping pole | 3. Double tube connector |
| 4. Adjustment lock | 5. Flange base |
| 6. Retractable handlebar | 7. Telescoping rod |
| 8. Snap lock | 9. Crossbar |
| 10. Sliding handlebar sockets | 11. Socket seat |
| 12. Pivotable connector | 13. Load Platform |
| 14. Load platform hinge | 15. Wheel frame |
| 16. Gear assembly | 17. Wheel |
| 18. Handle cushion | 19. Outer tube of telescoping rod |
| 20. Inner tube of telescoping rod | 21. Main Frame |
| 22. Adjustment nut and bolt | 23. Locking pin |
| 24. Set Screw | 25. Load platform bracing |
| 26. Anchoring stakes | 27. Anchoring weights |
| 28. Push lock | |

DETAILED DESCRIPTION

Figure 1:
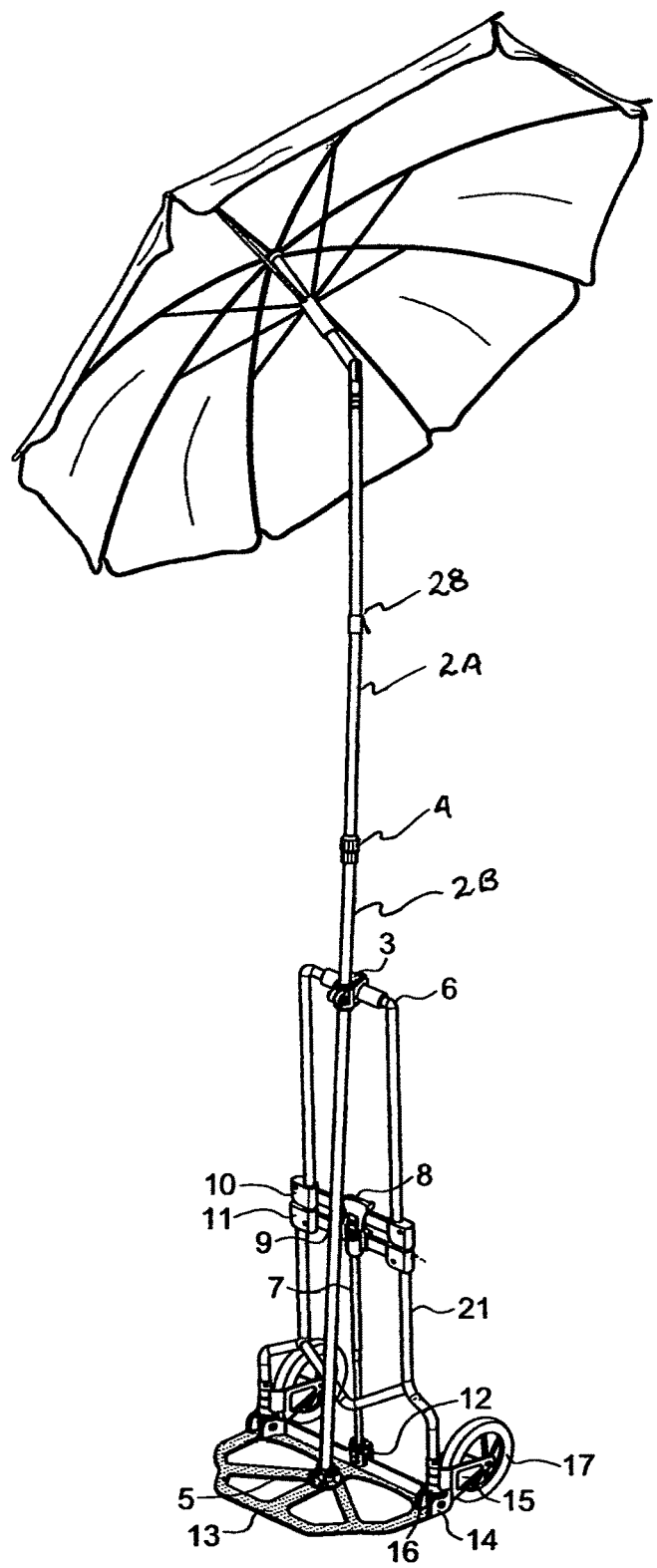
FIG. 1 Shows various aspects of the Portable Shade Provider with a tiltable umbrella attached to a foldable pushcart in accordance with one embodiment.
Figure 2:
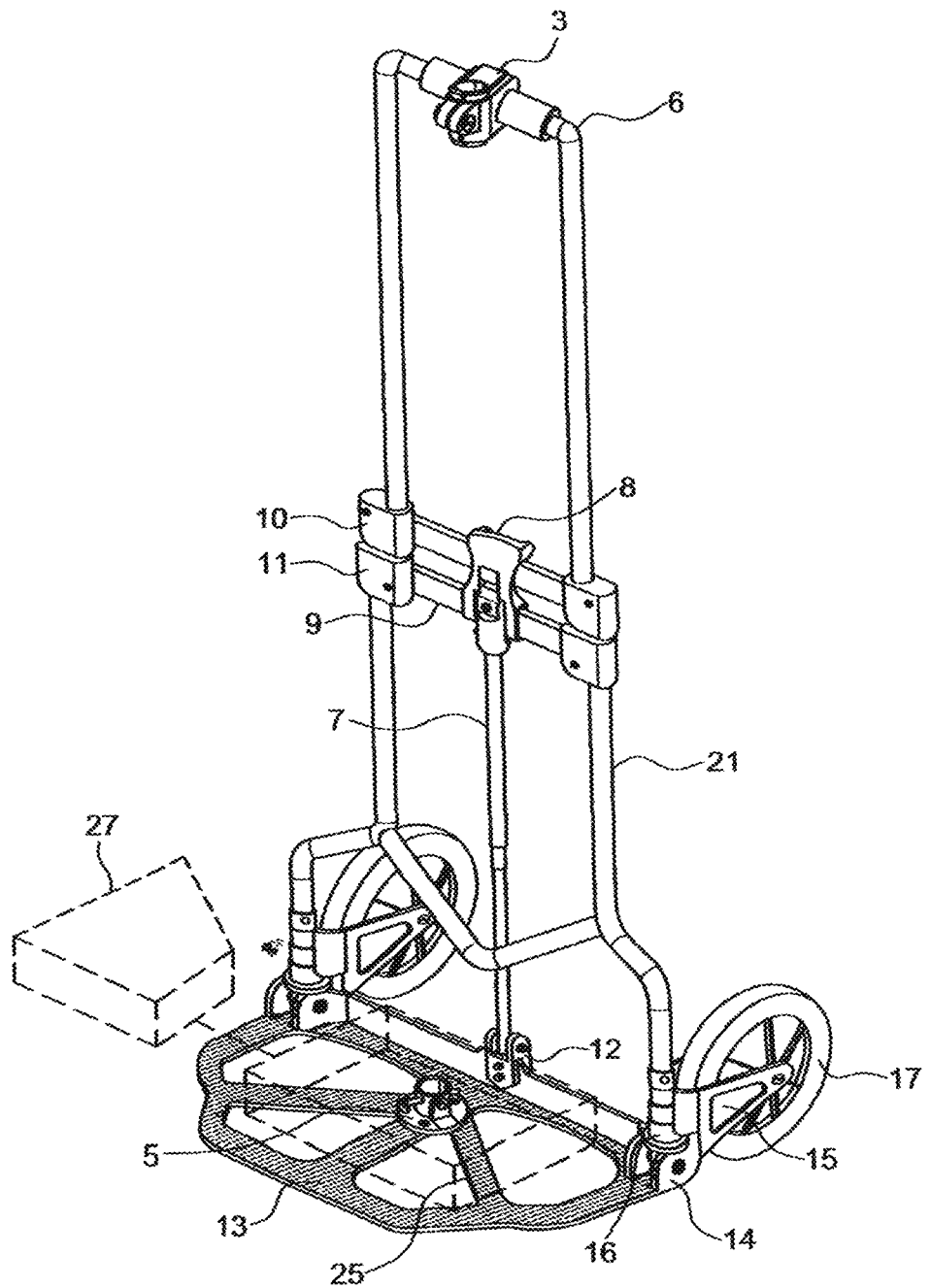
FIG. 2 Shows the foldable pushcart in its deployed position.
Figure 3:
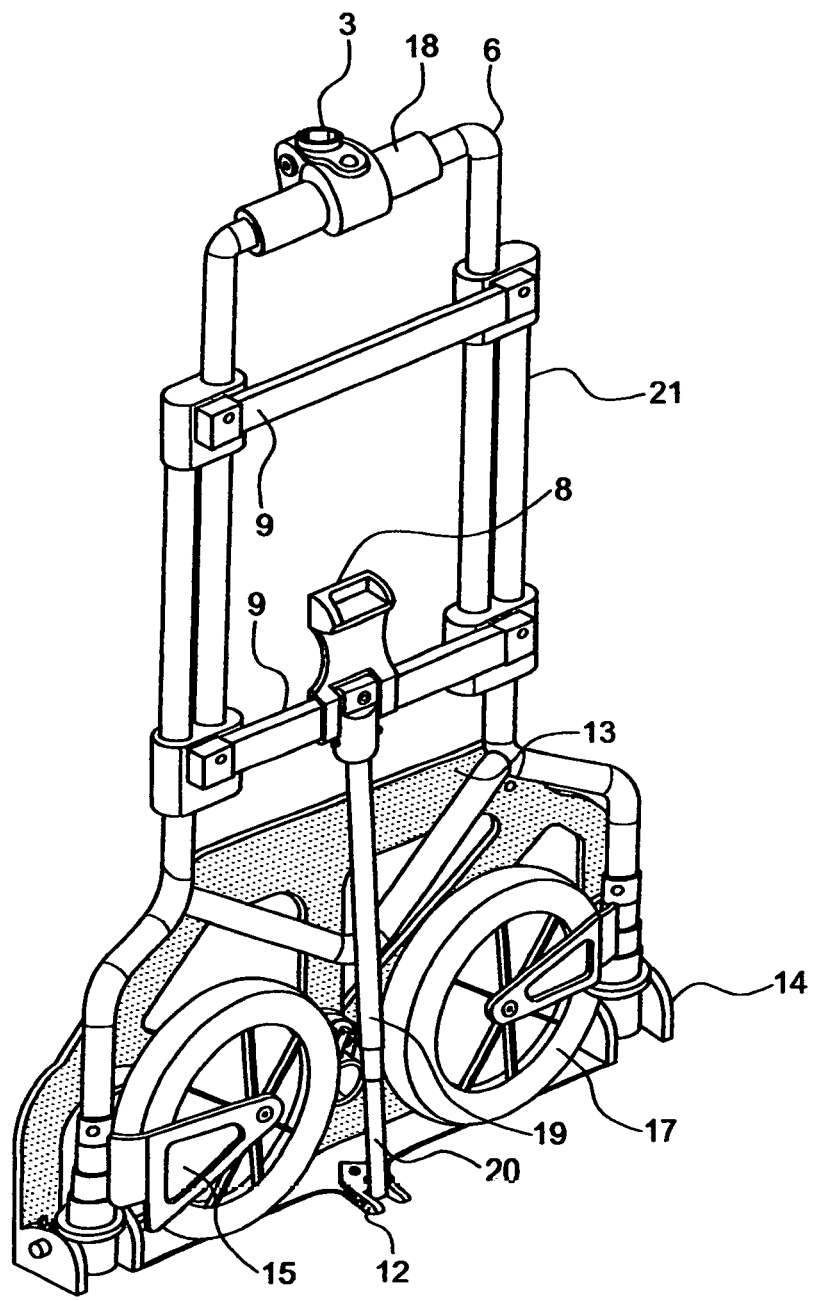
FIG. 3 Shows the foldable pushcart in the closed position.
Figure 4:
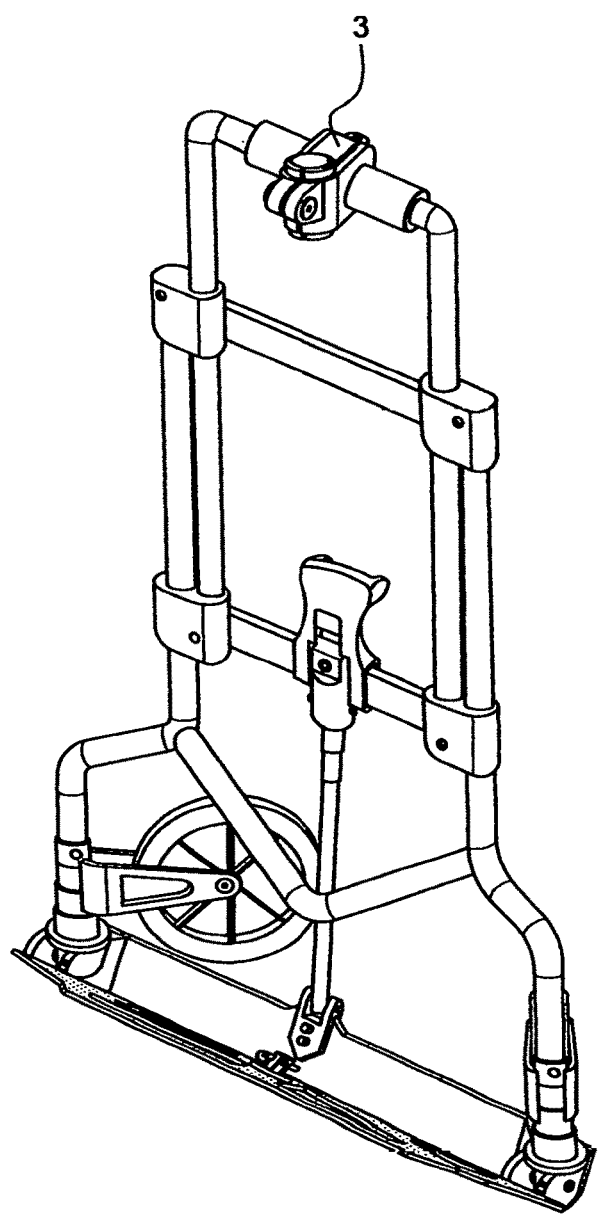
FIG. 4 Shows the foldable pushcart in it's partially deployed/closed position FIG. 5 Shows the double tube connector.
Figure 5:
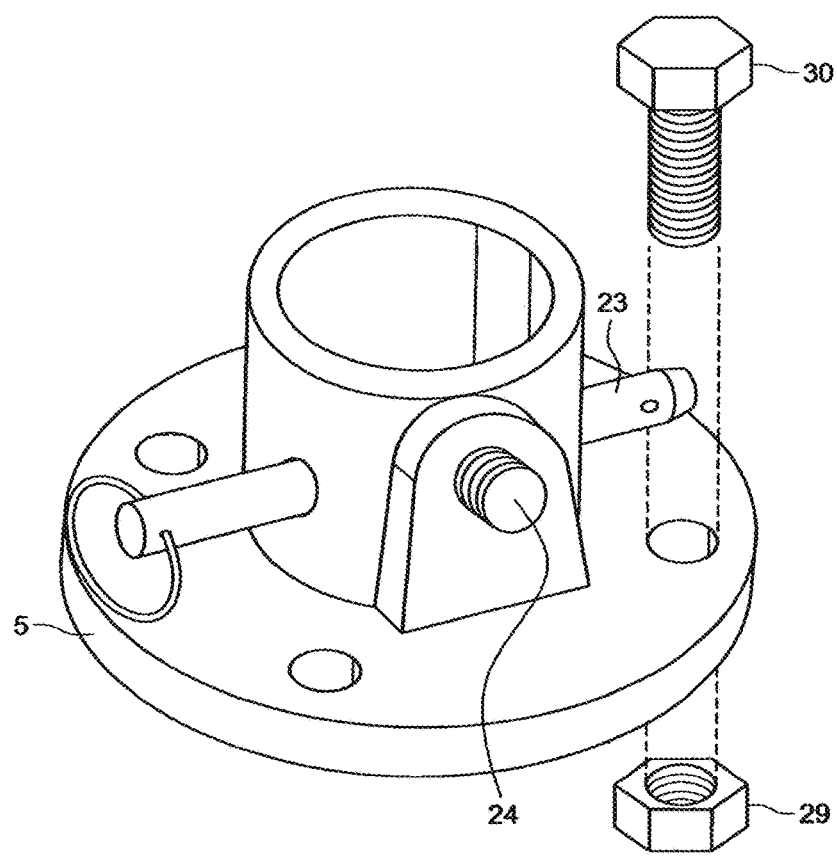
Figure 6:
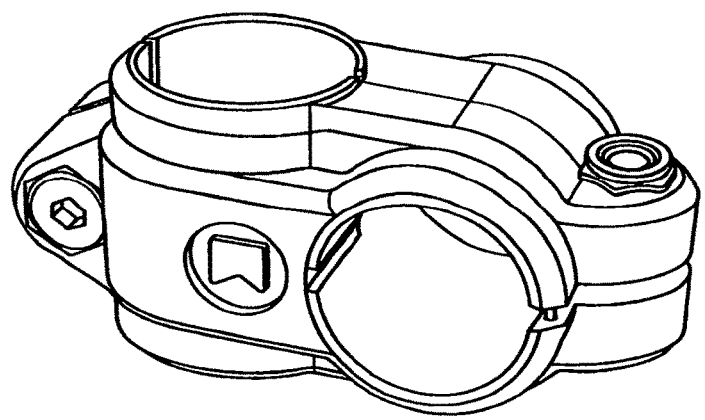
FIG. 6 Shows the flange base.
Figure 7:
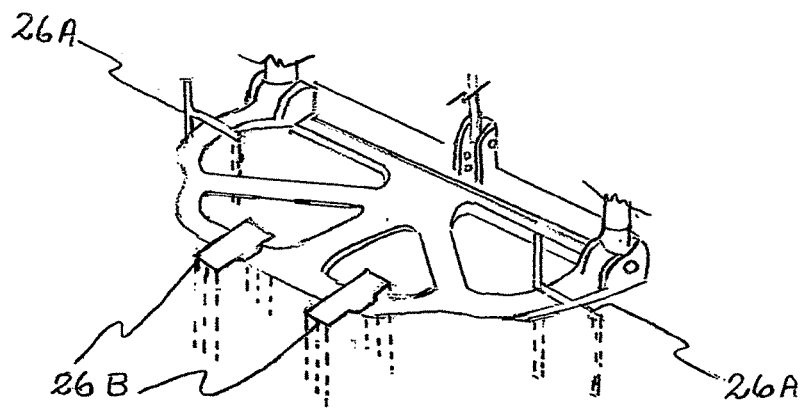
FIG. 7 Shows various anchoring embodiments—weights were not included in drawing since they could take on any shape, size and material that would fit on the load platform.
Figure 7:
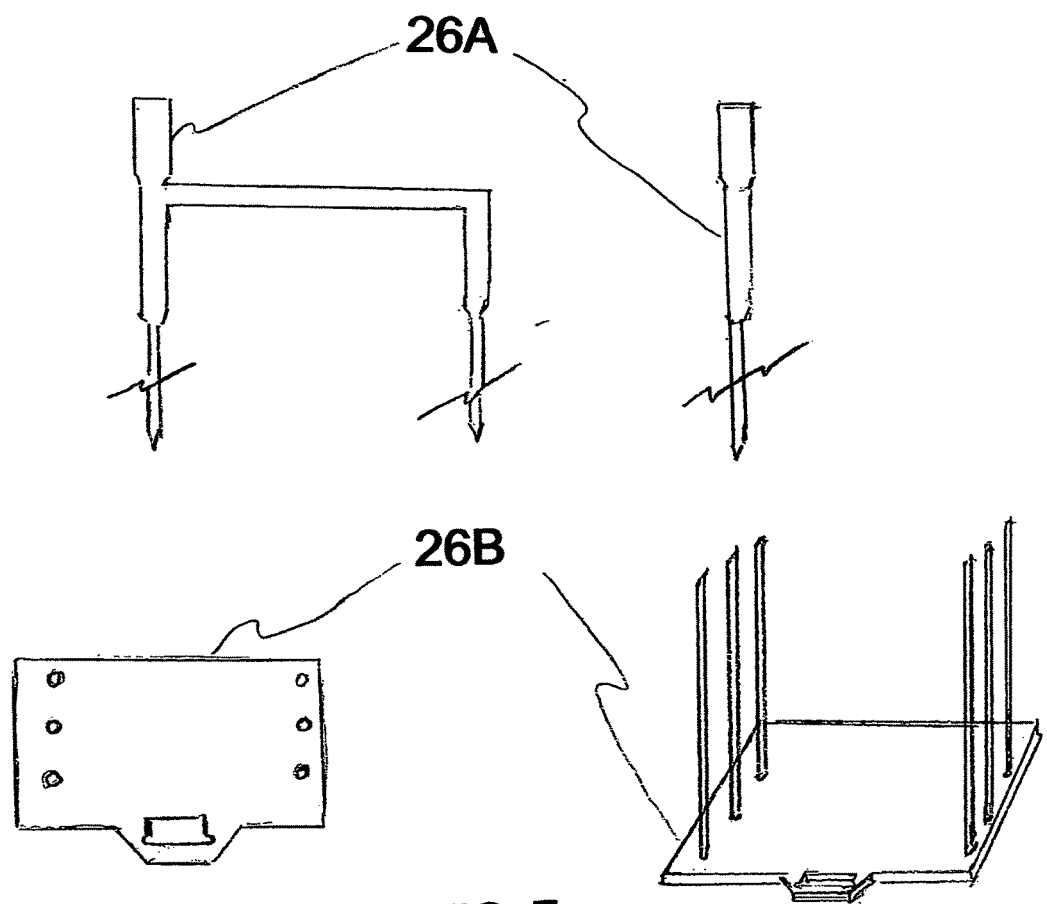

FIG. 1, FIG. 2, FIG. 3—First Embodiment

One embodiment of the Portable Shade Provider is shown in FIG. 1 wherein an Umbrella 1 with a tiltable and telescoping pole 2a attaches to an auxiliary telescoping pole 2b that is secured to the flange base 5 which is attached to the load platform 13 using nuts 29 and bolts 30. To secure said umbrella, a double tube connector 3 and is attached to the top handle 6 of the Pushcart FIG. 1. The auxiliary pole 2b is then passed through said double tube connector 3 to said flange base 5 of the pushcart FIG. 2. Various means of staking 26 are employed around the load platform spokes of 28 to secure the Portable Shade Protector Provider to the ground or pavement A weight 27 can then be fitted on the load platform 13.

Operation—FIGS. 1, 2, 3, 4, 5, 6

The manner of operating the Portable Shade Provider is to first push down on the load platform 13 which will engage the gear assembly 16 simultaneously pushing out the wheels 17. Next, disengage the spring aided snap lock 8 and pull up on the top handlebar 6 until it snaps into place on the top crossbar 9. At this time, anchor the load platform 13 to the earth by means of stakes and or weights 26 by deploying said stakes around the load platform bracing 25. Weights 27 can be deployed by fitting them on the load platform 13.

Attach the flange base 5 to the load platform 13 with nuts 29 and bolts 30 placed through the holes in the load platform bracing 25. Next, pass the auxiliary umbrella pole 2b through the double tube connector 3 to fit into the flange base 5. Now secure 2b to the flange base by tightening the set screw 24 and/or threading the locking pin 23 through the holes in the wall of said flange base 5 and the lined up holes at the base of the said auxiliary telescoping pole 2b. Finally, take umbrella 1 and its telescoping pole 2a and place it over the slightly smaller diameter said auxiliary telescoping pole 2b. and engage the adjustment lock 4 of auxiliary telescoping (umbrella)pole 2b. Adjust the tilt and height of the umbrella 1 to accommodate both the user and the activity.

I claim:

1. A shade producing apparatus comprising:
a pushcart having a collapsible handle, wheels, and a load platform;
an umbrella member having a telescoping and tiltable pole; said telescoping and tiltable pole being attached to a telescoping auxiliary pole; wherein said telescoping auxiliary pole is secured to a flange base that is mounted to the load platform; wherein the load platform includes a front edge and a back edge positioned adjacent to the wheels, wherein the flange base is positioned substantially closer to the back edge than to the front edge; wherein the apparatus further comprises a double tube connector that is attached to the collapsible handle to receive the umbrella member.

2. The shade producing apparatus of claim 1 further comprising a number of multipronged anchoring staples that secure the load platform to the ground.

3. The shade producing apparatus of claim 1 further comprising a fitted weight that can be fitted on the top of the load platform.

4. The shade producing apparatus of claim 1 wherein the telescoping auxiliary telescoping pole is secured to the flange base using a locking pin threaded through holes of at a bottom of said auxiliary pole and said flange base.

5. The shade producing apparatus of claim 1 wherein the telescoping auxiliary pole is secured to the flange base using a set screw that is part of said flange base.

6. The shade producing apparatus of claim 1 wherein the flange base is secured to the load platform using nuts and bolts.

7. A shade producing apparatus comprising: a pushcart having a pushcart having a collapsible handle, wheels, and a load platform;
an umbrella member having a telescoping and tiltable pole; said telescoping and tiltable pole being attached to a telescoping auxiliary pole; wherein said telescoping auxiliary pole is secured to a flange base that is mounted to the load platform; the load platform has a length and a width and the umbrella member has an open width that is at least twice as wide as at least one of the length and width of the load platform; wherein the apparatus further comprises a double tube connector that is attached to the collapsible handle to receive the umbrella member.

8. The shade producing apparatus of claim 7 wherein the load platform folds flat against a main frame of the pushcart and collapsible handlebar to provide compactness for greater stability to the umbrella member.

9. A shade producing apparatus comprising:
a pushcart having a collapsible handle, wheels, and a load platform;
an umbrella member having a telescoping and tiltable pole; said telescoping and tiltable pole being attached to a telescoping auxiliary pole; wherein said telescoping auxiliary pole is secured to a flange base that is mounted to the load platform; the collapsible handle is spaced apart from the wheels by a vertical distance and the umbrella member has a top center that is spaced apart from the handle by a distance that is greater than the vertical distance; wherein the apparatus further comprises a double tube connector that is attached to the collapsible handle to receive the umbrella member.

* * * * *